(12) United States Patent
Kang (10) Patent No.: US 7,369,755 B2
(45) Date of Patent: *May 6, 2008

(54) SYSTEM AND METHOD FOR SYNCHRONIZING VIDEO INDEXING BETWEEN AUDIO/VIDEO SIGNAL AND DATA

(75) Inventor: Bae Guen Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 236 days.

This patent is subject to a terminal disclaimer.

(21) Appl. No.: 11/363,320

(22) Filed: Feb. 28, 2006

(65) Prior Publication Data

US 2006/0140592 A1 Jun. 29, 2006

Related U.S. Application Data

(63) Continuation of application No. 09/756,858, filed on Jan. 10, 2001, now Pat. No. 7,072,575.

(30) Foreign Application Priority Data

Jan. 10, 2000 (KR) .................................. 2000-973

(51) Int. Cl.
*H04N 5/781* (2006.01)

(52) U.S. Cl. .......................... 386/125; 386/40; 386/45; 725/46

(58) Field of Classification Search ................. 386/40, 386/45, 83, 125, 126; 348/565, 564; 725/46, 725/61, 109; 375/240.24, 240.28; 709/204, 709/249

See application file for complete search history.

(56) References Cited

U.S. PATENT DOCUMENTS

| 5,930,444 | A | 7/1999 | Camhi et al. | |
|---|---|---|---|---|
| 6,236,395 | B1 * | 5/2001 | Sezan et al. | 715/723 |
| 6,618,764 | B1 * | 9/2003 | Shteyn | 709/249 |
| 6,640,241 | B1 * | 10/2003 | Ozzie et al. | 709/204 |
| 7,072,575 | B2 * | 7/2006 | Kang | 725/46 |

* cited by examiner

*Primary Examiner*—John Miller
*Assistant Examiner*—Christopher Onuaku
(74) *Attorney, Agent, or Firm*—Birch, Stewart, Kolasch & Birch, LLP (57) ABSTRACT

In the present system and method, synchronization information is inserted into specified positions of the content of a multimedia stream at the time when the contents are produced. Thus, the present invention enables a user to easily search the synchronization information on the specified positions through an annotation. As a result, a user can selectively control the playback of a video cartridge recorder through the annotation of a recorded MPEG stream.

13 Claims, 6 Drawing Sheets

| | shot/scene,GOP offset | Run time(ms) |
|---|---|---|
| TAG1 name | 1,000 | 200 |
| TAG2 name | 1,000 | 400 |
| ⋮ | ⋮ | ⋮ |
| TAGn name | end of stream | n | sequence(time)

FIG.4b

| | Run time(ms) |
|---|---|
| TAG1 name | 200 |
| TAG2 name | 400 |
| ⋮ | ⋮ |
| TAGn name | n | sequence(time)

SYSTEM AND METHOD FOR SYNCHRONIZING VIDEO INDEXING BETWEEN AUDIO/VIDEO SIGNAL AND DATA

This application is a continuation of application Ser. No. 09/756,858 filed Jan. 10, 2001, the entire contents of which are hereby incorporated by reference and for which priority is claimed under 35 U.S.C. § 120.

BACKGROUND OF THE INVENTION

1. Field of the Invention

The present invention relates to broadcast programs, and more particularly, to a system and method for synchronizing video indexing between an audio/video signal and data during recording and playback of a broadcast program.

2. Description of the Related Art

Recently, high-speed storage devices such as a hard disc have been implemented in digital television (DTV) receivers to record and playback broadcast programs, thereby developing a digital video recorder/player. Such recorder/player can be considered a personal TV receiver.

U.S. Pat. No. 5,930,444, entitled "A simultaneous writing and playback apparatus" discloses a method for a simple write/playback of a broadcast program, and cannot be regarded as a personal TV. Also, a personal video recorder (PVR) has recently been proposed by Tivo and ReplayTV. A PVR is generally designed to enable simultaneous writing of broadcast programs from different broadcasting stations for a maximum of 30 hours by implementing a hard disc in a TV or STB. Thus, the PVR allows a user to select and view a program from a variety of programs.

However, the PVR, as described above, is more for analog broadcastings and considers only the writing/playback of broadcast programs. Actual functions of a personal TV, for example, timed recordings of programs on an electronic program guide (EPG) using a guide information such as a program and system information protocol (PSIP), and application methods for TV functions related to broadcast programs with respect to standards have not yet been proposed. Also, the PVR in the related art lacks a separate logic for a simultaneous writing/playback, making application to a digital broadcasting difficult.

Figure 1:
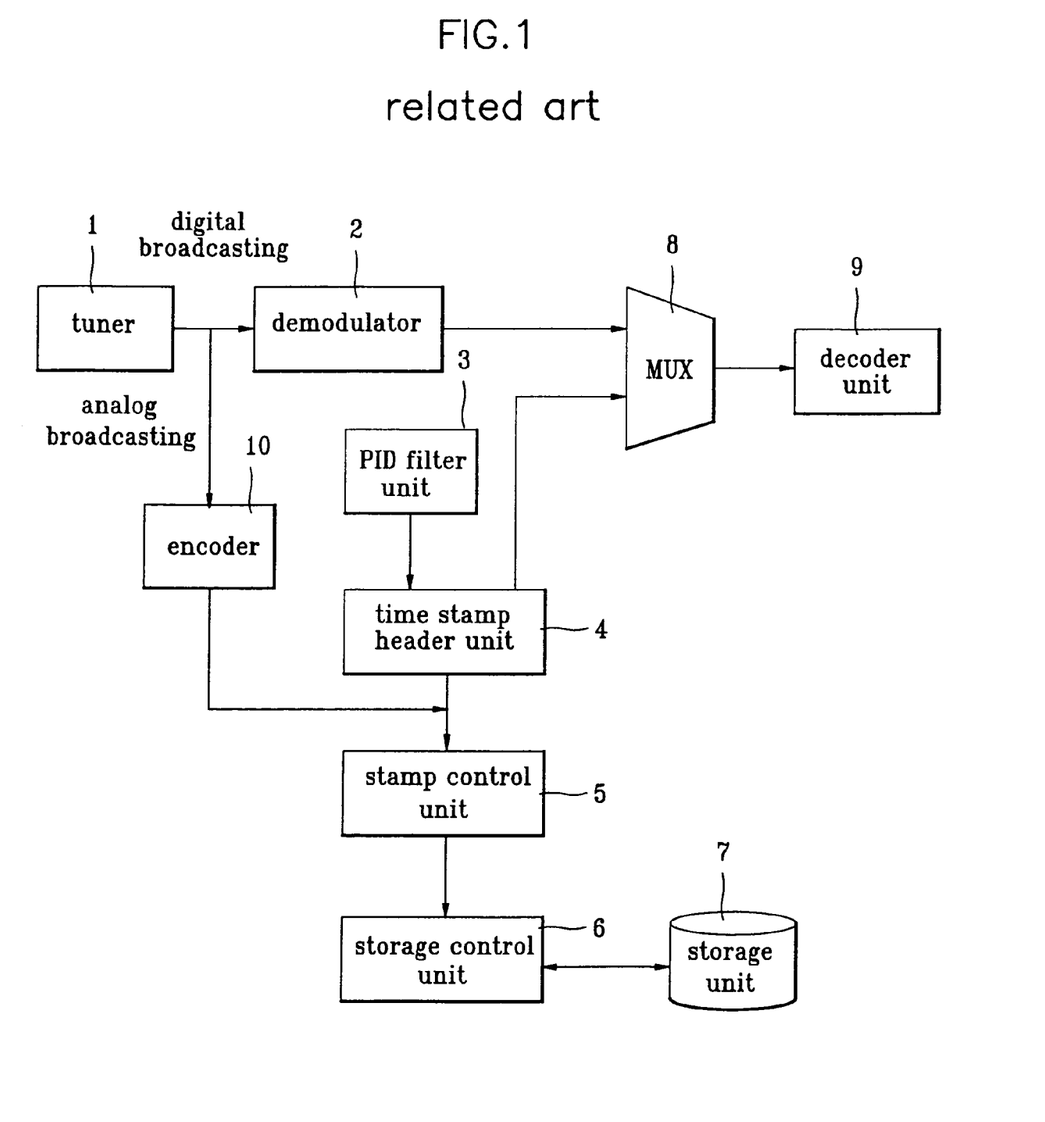
FIG. 1 is a block diagram of a simultaneous recording/playback device in the related art for a HDTV or SDTV class multichannel program.

FIG. 1 is a simultaneous recording/playback device of a digital broadcasting receiver in the related art for high-definition TV (HDTV) or standard-definition TV (SDTV) multichannel program.

Referring to FIG. 1, the conventional receiver includes a tuner 1 for tuning a broadcasting signal received through a broadcasting network; a demodulator 2 for demodulating a digital broadcasting signal output from the tuner 1 and outputting a live stream; an encoder 10 for encoding an analog broadcasting signal output from the tuner 1 and outputting transport stream (TS) signals; a data PID filter unit 3 for detecting the TS signals to be stored by filtering the live stream output from the demodulator 2; a time stamp header unit 4 for constructing a header by considering TS signals other than the TS signals detected by the data PID filter unit 3 and by counting figures of a NULL packet, and inserting the header among the partial TS signals; a storage unit 7 for storing the TS signal produced from the time stamp header unit 4 and the TS signal produced from the encoder 10; a stamp control unit 5 for controlling edition and reading of the TS signal stored in the storage unit 7; a storage control unit 6 for managing information stored in the storage unit 7; a multiplexer (MUX) 8 for selecting and outputting one of the TS signals output from the stamp control unit 5 and the demodulator 2; and a decoder unit 9 for decoding a signal selected by the MUX 8.

The conventional receiver as shown in FIG. 1 can also store general data such as text or Multipurpose Internet Mail Extension (MIME) data, graphic/image data, Hypertext/Extended Markup Language (HTML/XML) data and java applet data. However, when storing a broadcast program using the conventional broadcast program recording/playback apparatus as described above, specific points of a video cannot randomly be accessed. Therefore, a video index based on contents cannot be provided to users.

SUMMARY OF THE INVENTION

Accordingly, an object of the present invention is to solve at least the problems and disadvantages of the related art.

Specifically, an object of the present invention is to provide a more efficient system and method of synchronizing video indexing between an audio/video (A/V) signal and data during recording/playback of a broadcast program.

Another object of the present invention is to provide a broadcast program recording/playback apparatus and method which enables a user to easily search specified positions of broadcast programs.

A further object of the present invention is to provide an apparatus and method for improving the functions of a personal TV by inserting synchronization information in specified positions of contents at the time when the contents are produced, thereby enabling a user to easily search specified positions of the contents through an annotation using the synchronization information.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an apparatus for synchronizing video indexing between an A/V signal and data during recording/playback of a broadcast program comprises a contents production and synchronization unit for producing real time data to be synchronized with a broadcast program or producing a live broadcast program to be broadcasted; and a data transmission unit for combining XML TAG information output from the contents production/synchronization unit with the broadcast program, and transmitting the combined data to a broadcasting network in the form of an MPEG transport stream.

In another embodiment of the present invention, a system for synchronizing video indexing between an A/V signal and data during recording/playback of a broadcast program comprises a receiving system for receiving a broadcast program transmitted from a broadcasting network; simultaneously performing storage and playback of the broadcasting signal; and reading information required for video indexing by analyzing an XML TAG received in synchronization with a specified section through a path for data broadcasting.

In still another embodiment of the present invention, a method of synchronizing video indexing between an A/V signal and data during recording/playback of a broadcast program comprises detecting an XML TAG by analyzing an XML file among broadcasting information stored in a storage unit; detecting a time offset from the detected XML TAG; converting the detected time offset into a file offset; generating GOP (Group of Pictures) index files from the MPEG transport stream; reading a GOP index file and comparing the GOP index file to the file offset; storing the GOP index file and the XML TAG if the file offset is equal to the GOP index file, and otherwise, reading a next GOP index file and compared to the file offset until a GOP index file which matches the file offset is found for storage with the XML TAG.

The present invention has a annotation function for synchronization by combining the XML TAG with a specified shot/scene of the MPEG broadcasting stream. Also, the present invention has a video index function for selectively viewing a specified section from the annotation during playback of a stored stream.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 2:
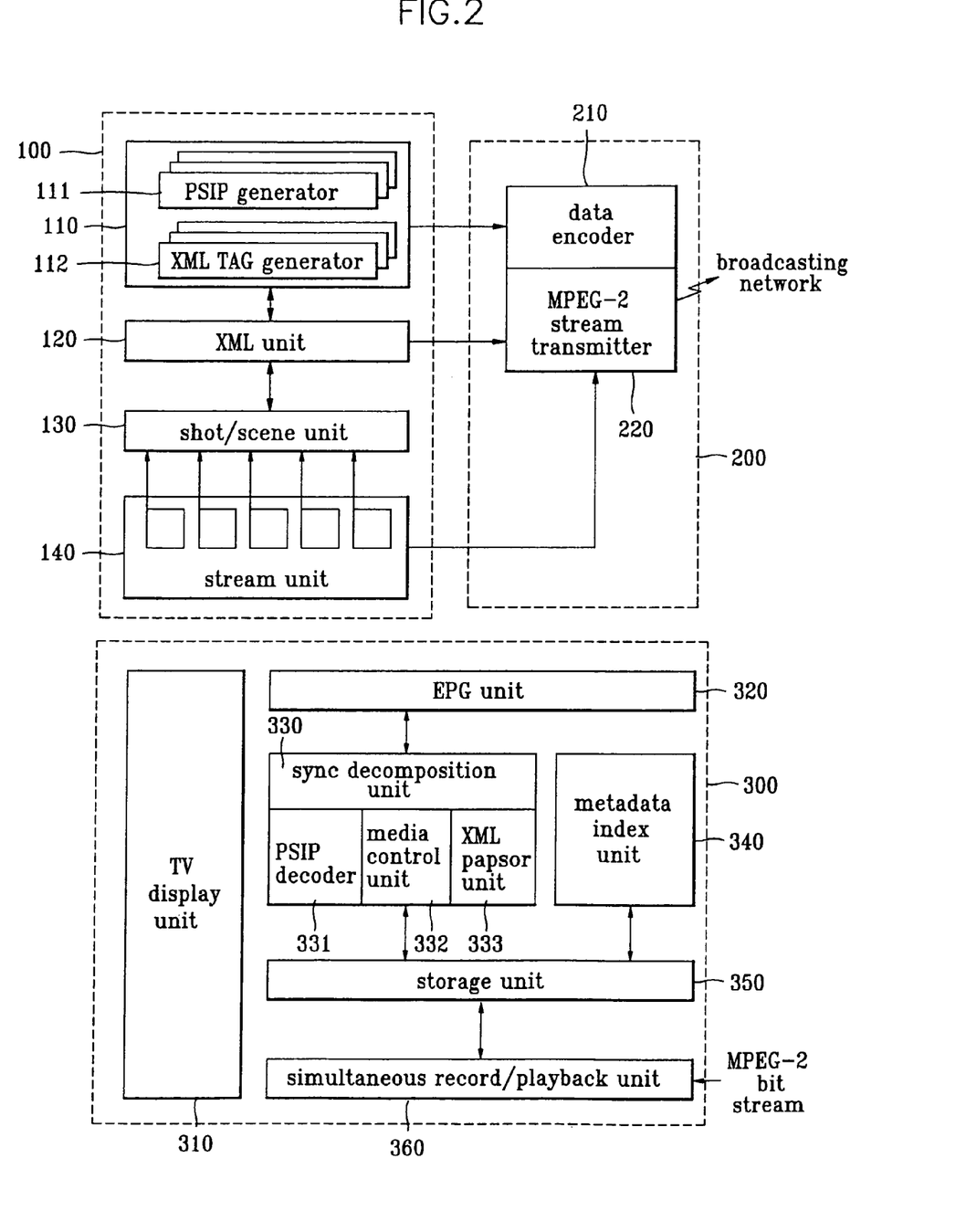
FIG. 2 is a block diagram of a system for synchronizing video indexing between an A/V signal and data during recording/playback of a broadcast program according to the present invention.

Reference will now be made in detail to the present invention, examples of which are illustrated in the accompanying drawings. Particularly, FIG. 2 shows a block diagram of a system for synchronizing video indexing between an A/V signal and data during recording/playback of a broadcast program according to the present invention, including a broadcast data synchronization and transmission system and a receiving system 300. Here, the broadcast data synchronization and transmission system can be divided into a contents production and synchronization (P/S) unit 100 and a data transmission unit 200.

Referring to FIG. 2, the contents (P/S) unit 100 generally produces, in real time, data to be synchronized with a broadcast program and produces live broadcast program to be broadcasted. Namely, the data to be synchronized with a broadcast program is the XML TAG information. The data transmission unit 200 combines the XML TAG information from the contents P/S unit 100 with the produced broadcast program, and transmits the combined data to a broadcasting network in the form of an MPEG transport stream, for example, MPEG-2 transport stream. The receiving system 300 receives the broadcast program transmitted from the data transmission unit 200 of the broadcast data synchronization and transmission system, may simultaneously record and playback the broadcasting signal, and reads information required for user video indexing by analyzing the XML TAG received in synchronization with specified sections through a path for data broadcasting.

More specifically, the contents P/S unit 100 includes a stream unit 140 which detects GOP positions for synchronization with an MPEG stream to be broadcasted on a TV; a shot/scene unit 130 which sets and marks the XML TAG in the corresponding GOP positions detected by the stream unit 140; an XML unit 120 which synchronizes the marked XML TAG with the MPEG stream to be broadcasted; and a generation unit 110 which includes an XML TAG generator 112 and which may include a PSIP generator 111.

The data transmission unit 200 includes a data encoder 210 which combines the XML TAG information with a broadcast program to be transmitted, and an MPEG-2 stream transmitter 220 which transmits to a broadcasting network the transport stream combined by the data encoder 210.

The receiving system 300 includes a simultaneous record/playback (R/P) unit 360 which simultaneously records and playbacks broadcasting information transmitted from the data transmission unit 200; a storage unit 350 which stores the broadcasting information to be recorded in the simultaneous R/P unit 360; a XML parser unit 333 which analyzes a XML file among the broadcasting information stored in the storage unit 350; a media control unit 332 which synchronizes an object file among the broadcasting information stored in the storage unit 350 and controls an operation of a video cartridge recorder (VCR), where the object file is a combination of an MPEG file and the XML file; a PSIP decoder 331 which decodes the broadcasting information stored in the storage unit 350; a synchronization (sync) decomposition unit 330 which searches a synchronized position of a specified section of the MPEG stream based on the outputs from the XML parser unit 333, the media control unit 332 and the PSIP unit 331; and a metadata index unit 340 which systematically stores information output from the sync decomposition unit 330.

In the above system, a conventional simultaneous recording/playback device as described with reference to FIG. 1 may be used for the simultaneous recording/playback unit 360. Also, the receiver system 300 may further include an EPG unit 320 which controls the metadata index unit 340 such that a user can search information stored in the metadata index unit 340; and a TV display unit 310 which displays the information stored in the metadata index unit 340 and the broadcasting information read by the simultaneous R/P unit 360.

The operation of the contents P/S unit 100 will next be explained in more detail.

Figure 3:
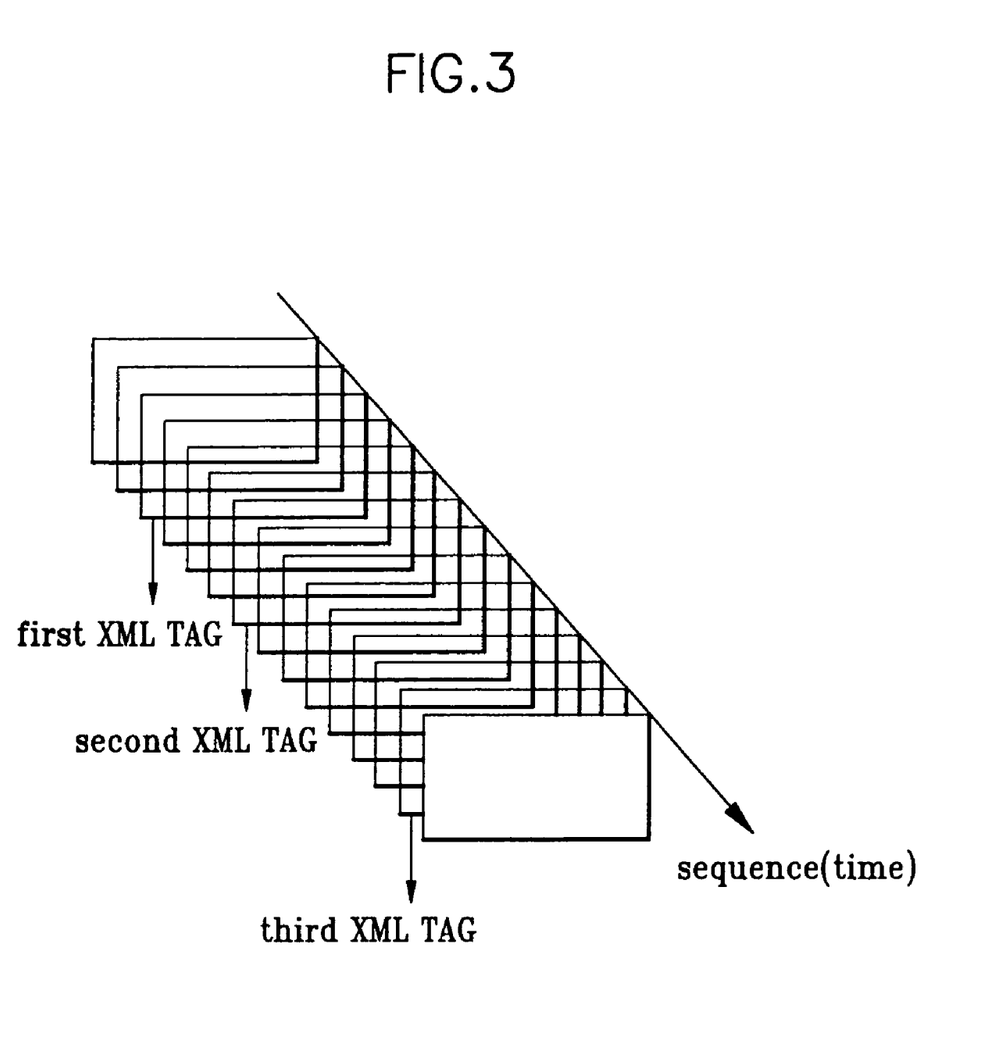
FIG. 3 illustrates a synchronized MPEG-2 stream with an XML TAG according to the present invention.

The stream unit 140 searches for positions to be synchronized with the MPEG stream to be broadcasted on the digital TV. Namely, the stream unit 140 searches for and locates GOPs using typical MPEG decoder logic based upon specified shot/scene as shown in FIG. 3. The shot/scene unit 130 then sets and marks corresponding XML TAGs in the position located by the stream unit 140. Subsequently, the generation unit 110 calculates the position information of the GOP offsets with respect to corresponding MPEG stream and generates reference values for indexing the MPEG stream to enable detection of the positions marked by the shot/scene unit 130. Thus, a logic link table as shown in FIG. 4A is produced.

Figure 4A:
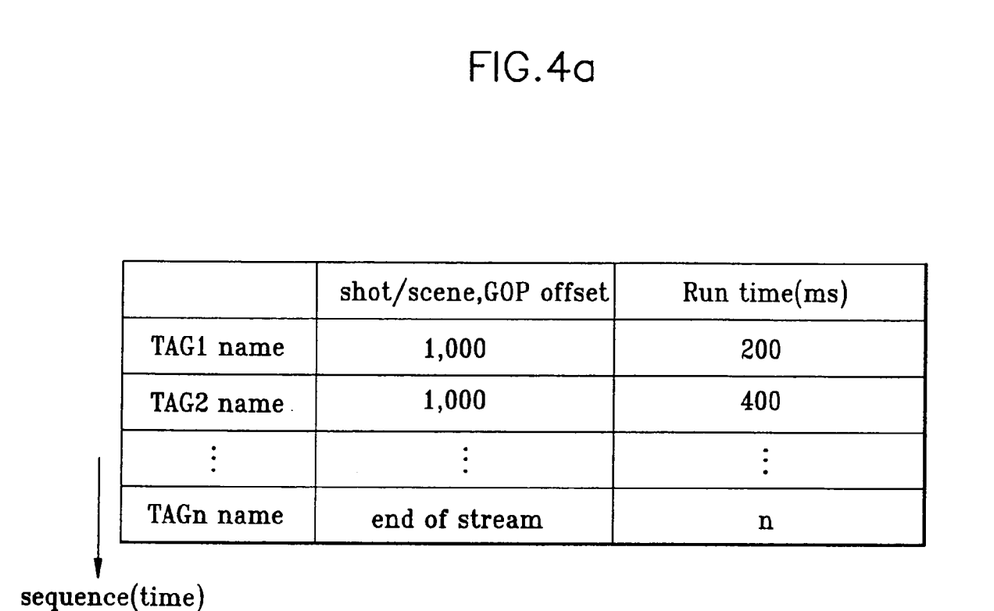
FIGS. 4A and 4B illustrate logic link tables according to the present invention.
Figure 4B:
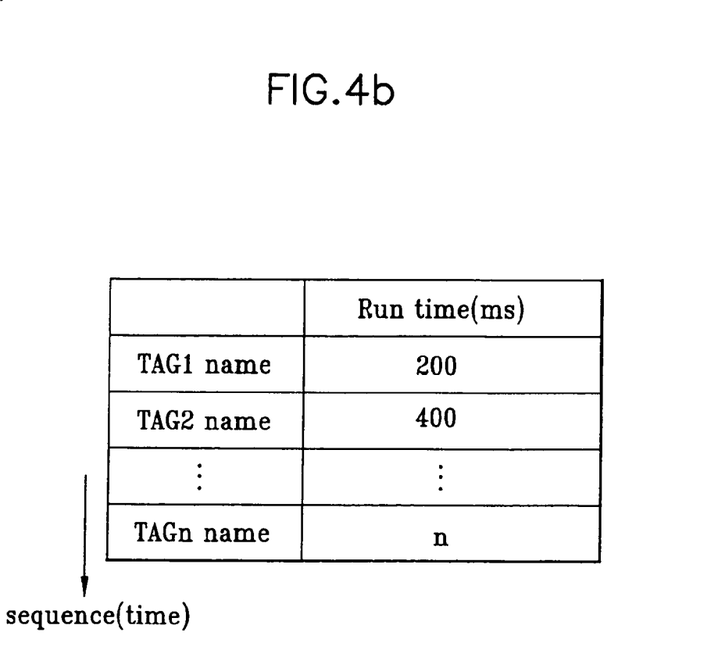

As shown in the logic link table of FIG. 4A, each TAG name, synchronized with a corresponding MPEG stream, is represented as an XML marker and is the run time in a series of time sequences corresponding to units of either a frame or GOP. Here, the link table produced preferably includes the tag names and corresponding time information as shown in FIG. 4B. Also, text information which can well describe specified shot/scenes is represented in XML and used as the annotation in the present invention. At this time, the text information gives a representative keyword to the metadata. Moreover, the XML TAG includes synchronization information of the link table shown in FIG. 4B produced by the XML unit 120 as well as other additional information, according to the type of a program, for an effective video indexing.

Table 1 below represents the XML TAG including the above-described information, and can be defined by a general user in accordance with the contents rule of the document type definition (DTD) of the XML. Accordingly, the annotation to be video-indexed using the XML TAG for the specified sections of a stored MPEG stream can be obtained.

TABLE 1

| < object type: news, movies, documentary, show, sports,... | > |
|---|---|
| < start time: 00:00:00 | > |
| < bit rates: MPPS | > |
| < time offset ( i.e. duration ): 00:00:00 | > |
| < completion time: 00:00:00 | > |
| < GOP offset: | > |
| < keyword: | > |

The operation of the data transmission unit 200 will next be explained.

Because the XML TAG information generated by the contents P/S unit 100 has time information when transmitted, the information is transmitted in the form of MPEG transport stream together with the broadcast program. Therefore, when the stream unit 140 transmits the MPEG-2 TS in the form of a 188-byte packet, the data encoder 210 searches for a proper null packet and combines the corresponding XML TAG information with the MPEG-2 stream. The data encoder 210 then transmits the XML TAG information to the broadcasting network through the MPEG-2 stream transmitter 220. The operation of searching for the null packet and inserting the XML TAG into the transmitted bit stream will not be explained in detail.

The operation of the receiving system 300 with the storage unit 350 will now be explained.

First, as shown in FIG. 2, the simultaneous R/P unit 360 receives the broadcast program transmitted in the form of MPEG-2 TS from the data transmission unit 200. The receiving system 300 not only performs a simultaneous recording/playback, but also reproduces information that a user requires for the video indexing by analyzing the XML TAG synchronized to specified sections.

Figure 5:
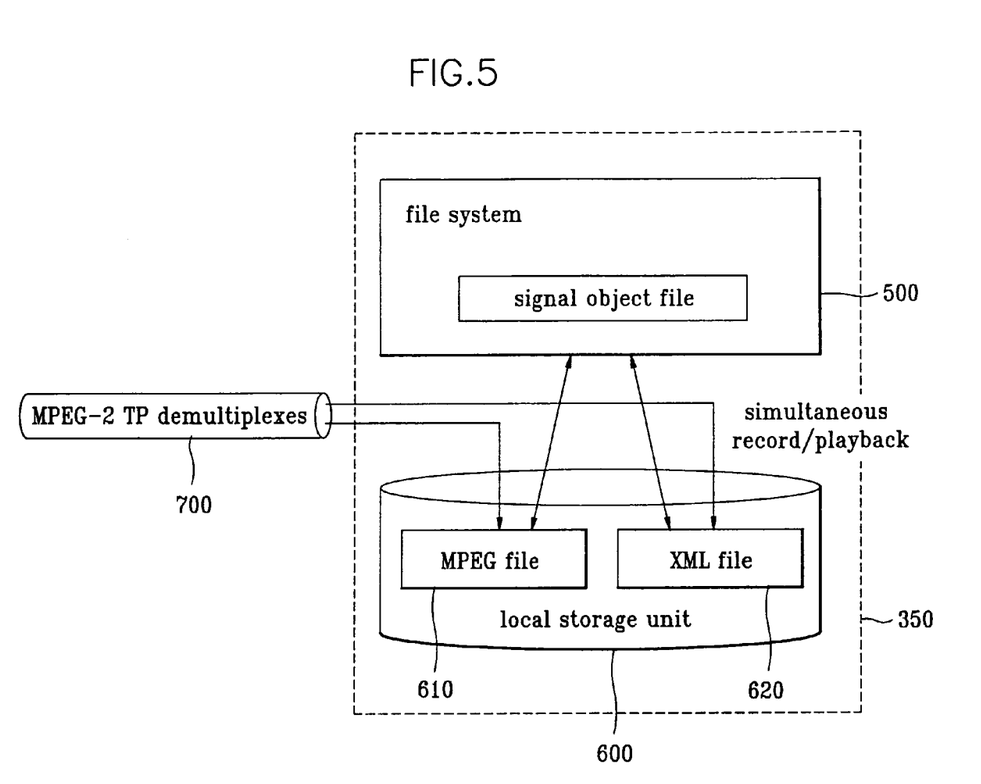
FIG. 5 illustrates the relation between a logic storage unit and a file system according to the present invention.

FIG. 5 shows the storage unit 350 including a file system which stores in a local storage unit 600 the XML data received from a MPEG-2 TP demultiplexer 700, where the XML data carries both an MPEG stream and synchronization information. At this time, the file system includes a mechanism to execute a simultaneous recording/playback of a HD program in a digital TV. Particularly, the XML parser unit 333 reads and analyzes an XML file 620 from the local storage unit 600. Here, the XML parser unit 333 analyzes the information shown in Table 1 above, and the analyzed XML file is the annotation information for video indexing.

Figure 6:
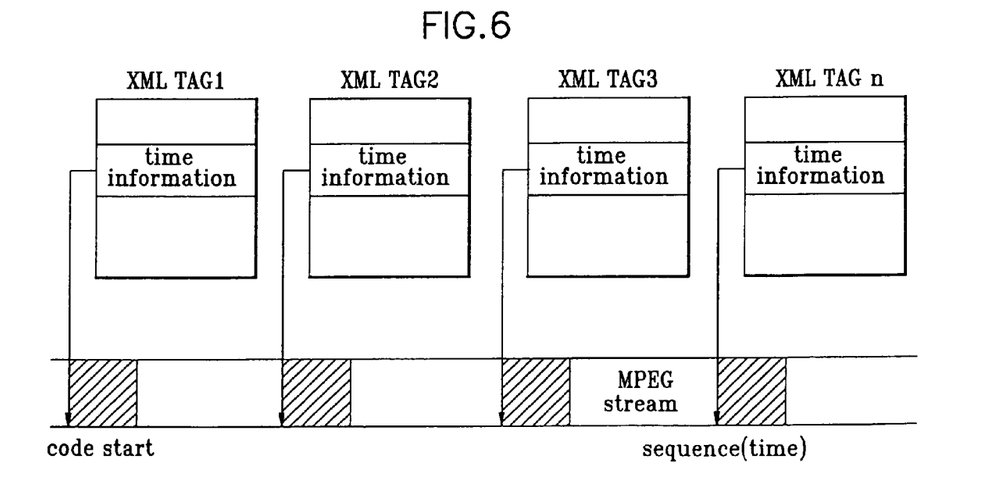
FIG. 6 illustrates the detection of a position of an MPEG stream through position information defined in a respective XML TAG according to the present invention.

The result of the analysis is stored in a single object file 500. The media control unit 332 then synchronizes the MPEG stream with data from the single object file, which links a MPEG file 610 and the XML file 620, and activates the VCR. A sync decomposition unit 330 converts the time information into a position information by searching the position synchronized with specified sections of the MPEG stream using the analyzed result from the XML parser unit 333. As shown in FIG. 6A, positions of a MPEG stream can be represented using time information in corresponding XML TAGs.

Figure 7:
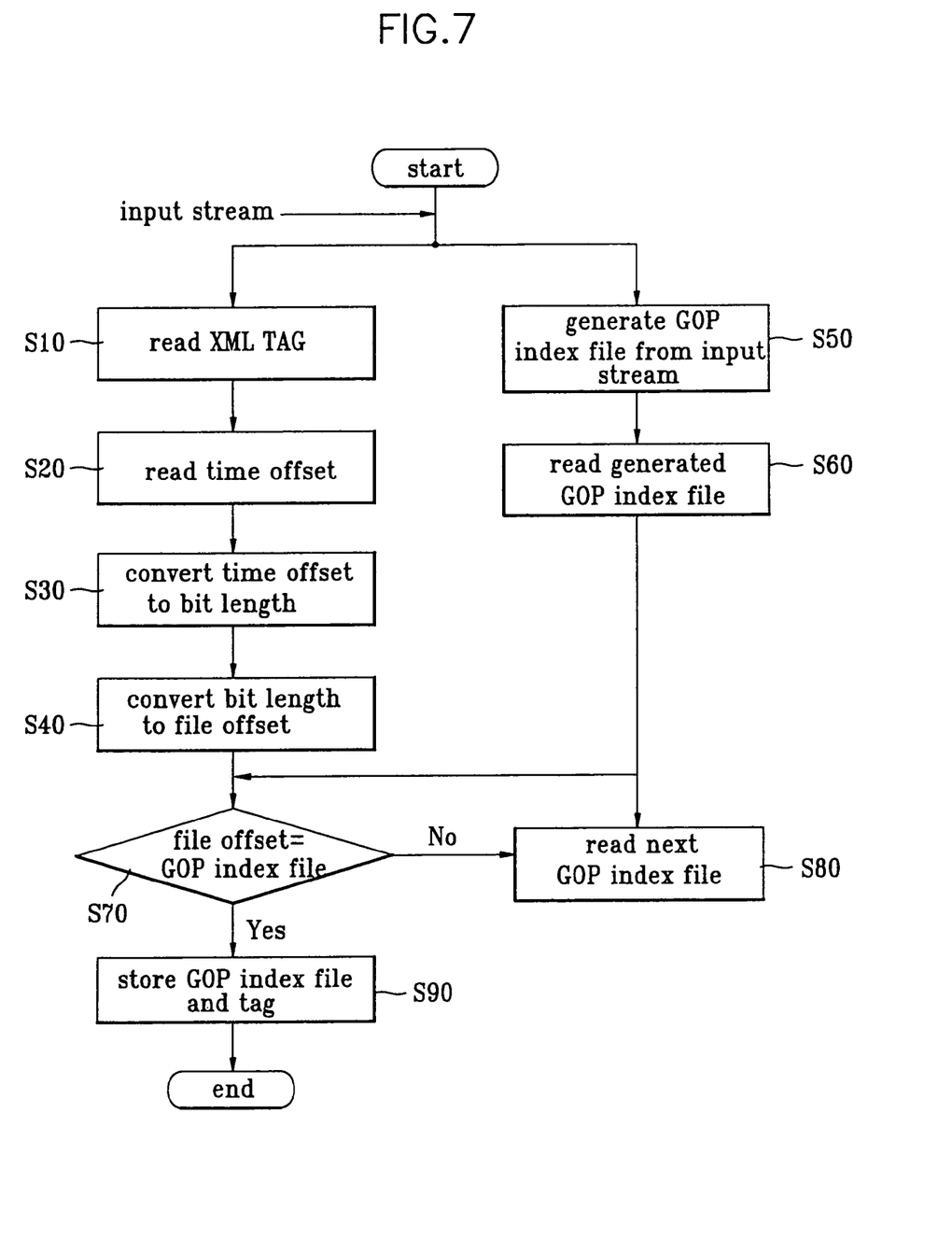
FIG. 7 is a flowchart of a method for detecting a specified position of an MPEG steam using the position information of FIG. 6.

The process of converting the time information into the position information is illustrated in FIG. 7.

Referring to FIG. 7, an XML TAG is first read from the input stream (S10) and a time offset, i.e. the time information, is detected from the XML TAG (S20). The detected time offset is then converted into a bit length by multiplying the time offset with a corresponding length of the MPEG stream (S30), and the resultant bit length is converted to a file offset (S40). Also, GOP index files are generated from the input stream as the stream is stored in the storage unit 350 (S50). Thereafter, a GOP index file is read (S60) and compared to the file offset (S70).

If the file offset is equal to the GOP index file, the GOP index file and the XML TAG read from step (s10) is stored and a next XML TAG is read. Otherwise, a next GOP file index is read and compared to the file offset (S80). This is repeated until a GOP index file which matches the file offset is found for storage with the XML TAG. After the last XML TAG is read and stored with corresponding GOP index file, the process ends.

In an alternate embodiment, the position information, i.e. GOP offset, may also be transmitted. In such case, both the time information of time offset and position information of GOP offset would be detected. Thereafter, the time offset may be converted into the file offset and compared with the detected GOP offset to store the XML TAG with a corresponding GOP offset.

Accordingly, a user can detect the position information and generate video indexing at any given time point using a keyword of the corresponding position. This function, which is one of the important functions of a personal TV, enables a viewer to selectively view a specified portion at any convenient time using a remote control of the TV.

Moreover, the metadata index unit 340 is a database that systematically stores the results from the sync decomposition unit 330, and a user can easily access an interactive information by searching for a single object file. Specifically, the metadata index unit 340 stores the metadata, which is an attribute of the program, to enable a search of the list of the stored program or to comprehend an attribute of a program. Thus, the user can search for a single object file at any time using the information stored in the metadata index unit 340 through the EPG unit 320, and can view the searched information through the TV display unit 330, such that an access of the interactive information is not only possible, but easy.

As described above, according to the present invention for synchronizing video indexing between the A/V signal and the data during a recording and playback of broadcast programs, an annotation for simply video-indexing the XML TAG is used and thus a user can selectively control the operation of the VCR through the annotation of the stored MPEG stream.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A system for synchronizing video indexing between an audio/video (A/V) signal and data for a broadcast program, comprising:
  a broadcast data synchronization and transmission system which produces a live broadcast program to be broadcasted and Extendible Markup Language (XML) TAG information for the live broadcast program, combines the XML TAG information with the produced broadcast program, and transmits the combined data of a Moving Picture Expert Group (MPEG) transport stream to a broadcasting network,
  wherein the broadcast data synchronization and transmission system includes a contents production and synchronization unit which comprises:
  a stream unit which detects group of pictures (GOP) positions of the MPEG stream to be broadcasted on a television; and
  a shot/scene unit which sets and marks the XML TAG information in the corresponding GOP positions detected by the stream unit.

2. The system of claim 1, wherein the contents production and synchronization unit further comprises:
  an XML unit which synchronizes the marked XML TAG information with the MPEG stream to be broadcasted; and
  a generation unit which generates and outputs the XML TAG information based upon a result from the XML unit.

3. A system for synchronizing video indexing between an audio/video (A/V) signal and data for a broadcast program, comprising:
  a broadcast data synchronization and transmission system which produces a live broadcast program to be broadcasted and Extendible Markup Language (XML) TAG information for the live broadcast program, combines the XML TAG information with the produced broadcast program, and transmits the combined data of a Moving Picture Expert Group (MPEG) transport stream to a broadcasting network,
  wherein the broadcast data synchronization and transmission system includes a contents production and synchronization unit which comprises:
  an XML unit which synchronizes marked XML TAG information with the MPEG stream to be broadcasted; and
  a generation unit which generates and outputs the XML TAG information based upon the result from the XML unit.

4. The system of claim 3, wherein the contents production and synchronization unit further includes:
  a stream unit which detects a group of pictures (GOP) positions of the MPEG transport stream to be broadcasted on a television; and
  a shot/scene unit which sets and marks the XML TAG information in the corresponding GOP positions detected by the stream unit.

5. The system of claim 3, wherein the broadcast data synchronization and transmission system further comprises a data transmission unit for combining the XML TAG information from the contents production and synchronization unit with the produced broadcast program and transmitting the combined data in a form of the MPEG transport stream.

6. A receiving system for synchronizing video indexing between an audio/video (A/V) signal and data for a broadcast program, comprising:
  a media control unit which synchronizes an object file among a Motion Picture Expert Group (MPEG) transport stream stored in a storage unit and controls an operation of a video cartridge recorder, where the object file is a combination of an MPEG file and an Extendible Markup Language (XML,) file;
  a synchronization decomposition unit which searches for synchronized positions of a specified section of the MPEG stream based on outputs from an XML parser unit and the media control unit; and
  a metadata index unit which systematically stores information output from the synchronization decomposition unit.

7. A system for synchronizing video indexing between an audio/video (A/V) signal and data for a broadcast program, comprising:
  a broadcast data synchronization and transmission system which includes a stream unit for detecting group of pictures (GOP) positions of a Motion Picture Expert Group (MPEG) stream to be broadcasted on a television, and a shot/scene unit for setting and marking Extendible Markup Language (XML) TAG information in the corresponding GOP positions detected by the stream unit; and
  a receiving system which includes a media control unit for synchronizing an object file among the MPEG transport stream stored in a storage unit and controlling an operation of a video cartridge recorder, where the object file is a combination of an MPEG file and an XML file, a synchronization decomposition unit for searching for synchronized positions of a specified section of the MPEG stream based on outputs from an XML parser unit and the media control unit, and a metadata index unit for systematically storing information output from the synchronization decomposition unit.

8. A receiving system, comprising:
  a media control unit which synchronizes an object file among a Motion Picture Expert Group (MPEG) transport stream stored in a storage unit and controls an operation of a video cartridge recorder, where the object file is a combination of an MPEG file and an Extendible Markup Language (XML) file;
  an XML parser unit which analyzes the XML file among the MPEG transport stream stored in the storage unit;
  a synchronization decomposition unit which searches for synchronized positions of specified section of the MPEG stream based on outputs from an XML parser unit and the media control unit; and
  a metadata index unit which systematically stores information output from the synchronization decomposition unit.

9. The system of claim 8, further comprising:
  a simultaneous record/playback unit which simultaneously records and playbacks the MPEG transport stream received from a broadcast data synchronization and transmission system; and
  an XML parser unit which analyzes the XML file among the MPEG transport stream stored in the storage unit, wherein the storage unit stores the MPEG transport stream to be recorded in the simultaneous record/playback unit.

10. The system of claim 8, wherein the receiving system receives the MPEG transport stream from a broadcasting network, simultaneously records and playbacks the MPEG transport stream, and reads information required for user video indexing by analyzing XML TAG information received in synchronization with specified sections of the MPEG transport stream.

11. A system for synchronizing video indexing between an audio/video (A/V) signal and data for a broadcast program, comprising:
   a contents production and synchronization unit which produces a live broadcast program to be broadcasted and Extendible Markup Language (XML) TAG information of the broadcast program; and
   a data transmission unit which combines the XML TAG information from the contents production and synchronization unit with the produced broadcast program, and transmits the combined data as a Moving Picture Expert Group (MPEG) transport stream to a broadcasting network,
   wherein the contents production and synchronization unit comprises:
   a stream unit which detects group of pictures (GOP) positions of the MPEG stream to be broadcasted on a television; and
   a shot/scene unit which sets and marks the XML TAG information in the corresponding GOP positions detected by the stream unit.

12. A method for synchronizing video indexing between an audio/video (A/V) signal and data for a broadcast program, comprising:
   producing, at a contents production and synchronization unit, a live broadcast program to be broadcasted and Extendible Markup Language (XML) TAG information for the live broadcast program; and
   combining, at a data transmission unit, the XML TAG information with the produced broadcast program, and transmitting the combined data in a form of a Motion Picture Expert Group (MPEG) transport stream to a broadcasting network,
   wherein the contents production and synchronization unit includes a stream unit which detects group of pictures (GOP) positions of the MPEG stream to be broadcasted on a television, and a shot/scene unit which sets and marks the XML TAG information in the corresponding GOP positions detected by the stream unit.

13. The method of claim 12, wherein the contents production and synchronization unit further includes an XML unit which synchronizes the marked XML TAG with the MPEG stream to be broadcasted, and a generation unit which generates and outputs the XML TAG information based upon the result from the XML unit.

* * * * *